US008725674B1

(12) United States Patent
Bennett et al.

(10) Patent No.: US 8,725,674 B1
(45) Date of Patent: May 13, 2014

(54) METHOD AND APPARATUS FOR PROVIDING A PRODUCT METADATA DRIVEN OPERATIONS SUPPORT SYSTEM

(75) Inventors: Richard L. Bennett, Holmdel, NJ (US); Richard R. Erickson, Farmingdale, NJ (US); Mark E. Francis, Flemington, NJ (US); Brian D. Freeman, Farmingdale, NJ (US); Steven R. Polston, Flemington, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 1260 days.

(21) Appl. No.: 11/478,915

(22) Filed: Jun. 30, 2006

(51) Int. Cl.
*G06F 7/00* (2006.01)
*G06F 17/00* (2006.01)

(52) U.S. Cl.
USPC .......................................................... 707/601

(58) Field of Classification Search
None
See application file for complete search history.

(56) References Cited

U.S. PATENT DOCUMENTS

| | | | | |
|---|---|---|---|---|
| 6,104,796 | A * | 8/2000 | Kasrai | 379/201.12 |
| 6,272,208 | B1 * | 8/2001 | Kasrai | 379/15.03 |
| 6,766,361 | B1 * | 7/2004 | Venigalla | 709/217 |
| 7,069,291 | B2 * | 6/2006 | Graves et al. | 709/201 |
| 2003/0187669 | A1 * | 10/2003 | Hassinger et al. | 705/1 |
| 2006/0203732 | A1 * | 9/2006 | Covino et al. | 370/241 |

OTHER PUBLICATIONS

Friere et al. "MetaComm: a meta-directory for telecommunications", Proceedings of the 16th International Conference on Data Engineering, pp. 211-219, IEEE, 2000.*

* cited by examiner

*Primary Examiner* — Michael Hicks

(57) ABSTRACT

A method and apparatus for providing a metadata driven framework for operations support systems are disclosed. In one embodiment, the method provides a hierarchical schema for a product. For example, a metadata for each element in the hierarchical structure, and a metalanguage for controlling tasks such as data collection, data orchestration, validation, field rendering, etc. are then created. In one embodiment, the method then provides framework aware engines for compiling the metadata and metalanguage into runtime forms. For each service or product to be provided, the product or service specific behavior and the operations support systems that are impacted are identified. The framework aware engine then compiles the metadata at runtime to generate at least one update for at least one operations support function.

7 Claims, 5 Drawing Sheets

METHOD AND APPARATUS FOR PROVIDING A PRODUCT METADATA DRIVEN OPERATIONS SUPPORT SYSTEM

The present invention relates generally to communication networks and, more particularly, to a method for providing a metadata driven framework for operational support systems used in packet networks such as Voice over Internet Protocol (VoIP) and Service over Internet Protocol (SoIP) networks.

BACKGROUND OF THE INVENTION

The Internet has emerged as a critical communication infrastructure, carrying traffic for a wide range of important applications. Internet services such as VoIP and SoIP services are becoming ubiquitous. Businesses are expanding globally and adding new services and products based on expansion of the communications network. In turn, the operations support systems are updated to incorporate changes. Unfortunately, product specific coding is time consuming and expensive. In some businesses where products are often added and removed on a regular basis, the operations support system may be outdated soon after its completion. The workflow, per product or service entry, and the validation are often accomplished based on multiple layers of coding in the operations support systems. Frequent updates to the operations support system become very expensive.

Therefore, there is a need for a method and apparatus that drives operations support systems in accordance with product metadata.

SUMMARY OF THE INVENTION

In one embodiment, the present invention discloses a method and apparatus for providing a product metadata driven framework for operations support systems, e.g., as used in packet networks such as Voice over Internet Protocol (VoIP) and Service over Internet Protocol (SoIP) networks. The method provides a hierarchical schema for a product (e.g., broadly defined as a product and/or a service). For example, a hierarchical schema may include attributes, components, products and/or offers. A metadata for each element in the hierarchical structure, and a metalanguage for controlling tasks such as data collection, data orchestration, validation, field rendering, etc. are then created. In one embodiment, the method then provides framework aware engines for compiling the metadata and metalanguage into runtime forms. For each service or product to be provided, the impacts to operational support system behavior are identified and described via the metadata and metalanguage at design time. A runtime implementation of the behavior is created by compiling and/or referencing the configured metadata and metalanguage via the framework aware engine to generate at least one capability or update for at least one operations support function.

BRIEF DESCRIPTION OF THE DRAWINGS

The teaching of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present invention broadly discloses a method and apparatus for providing a product metadata driven framework for operations support systems, e.g., used in packet networks such as Voice over Internet Protocol (VoIP) and Service over Internet Protocol (SoIP) networks. Although the present invention is discussed below in the context of VoIP and SoIP networks, the present invention is not so limited. Namely, the present invention can be applied for operations systems used to deliver products or services in any industry outside of the telecommunication field. Furthermore, the use of the term "product" should be broadly interpreted herein to include a product and/or a service.

Figure 1:
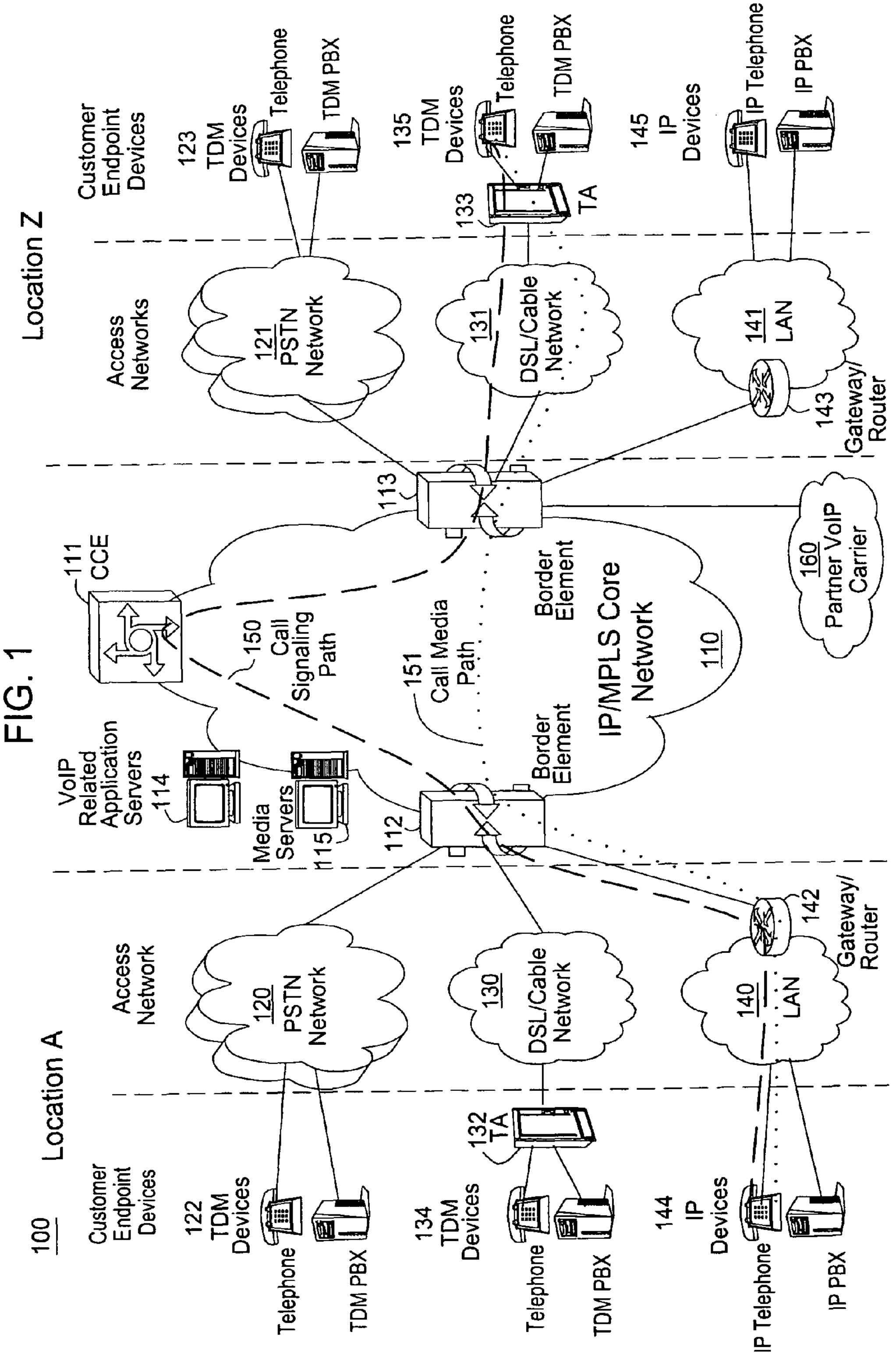
FIG. 1 illustrates an exemplary network related to the present invention.

To better understand the present invention, FIG. 1 illustrates an example network 100, e.g., a packet network such as a VoIP network related to the present invention. Exemplary packet networks include Internet protocol (IP) networks, Asynchronous Transfer Mode (ATM) networks, frame-relay networks, and the like. An IP network is broadly defined as a network that uses Internet Protocol to exchange data packets. Thus, a VoIP network or a SoIP (Service over Internet Protocol) network is considered an IP network.

In one embodiment, the VoIP network may comprise various types of customer endpoint devices connected via various types of access networks to a carrier (a service provider) VoIP core infrastructure over an Internet Protocol/Multi-Protocol Label Switching (IP/MPLS) based core backbone network. Broadly defined, a VoIP network is a network that is capable of carrying voice signals as packetized data over an IP network. The present invention is described below in the context of an illustrative VoIP network. Thus, the present invention should not be interpreted as limited by this particular illustrative architecture.

The customer endpoint devices can be either Time Division Multiplexing (TDM) based or IP based. TDM based customer endpoint devices 122, 123, 134, and 135 typically comprise of TDM phones or Private Branch Exchange (PBX). IP based customer endpoint devices 144 and 145 typically comprise IP phones or IP PBX. The Terminal Adaptors (TA) 132 and 133 are used to provide necessary interworking functions between TDM customer endpoint devices, such as analog phones, and packet based access network technologies, such as Digital Subscriber Loop (DSL) or Cable broadband access networks. TDM based customer endpoint devices access VoIP services by using either a Public Switched Telephone Network (PSTN) 120, 121 or a broadband access network 130, 131 via a TA 132 or 133. IP based customer endpoint devices access VoIP services by using a Local Area Network (LAN) 140 and 141 with a VoIP gateway or router 142 and 143, respectively.

The access networks can be either TDM or packet based. A TDM PSTN 120 or 121 is used to support TDM customer endpoint devices connected via traditional phone lines. A packet based access network, such as Frame Relay, ATM, Ethernet or IP, is used to support IP based customer endpoint devices via a customer LAN, e.g., 140 with a VoIP gateway and router 142. A packet based access network 130 or 131, such as DSL or Cable, when used together with a TA 132 or 133, is used to support TDM based customer endpoint devices.

The core VoIP infrastructure comprises of several key VoIP components, such as the Border Elements (BEs) 112 and 113, the Call Control Element (CCE) 111, VoIP related Application Servers (AS) 114, and Media Server (MS) 115. The BE resides at the edge of the VoIP core infrastructure and interfaces with customers endpoints over various types of access networks. A BE is typically implemented as a Media Gateway and performs signaling, media control, security, and call admission control and related functions. The CCE resides within the VoIP infrastructure and is connected to the BEs using the Session Initiation Protocol (SIP) over the underlying IP/MPLS based core backbone network 110. The CCE is typically implemented as a Media Gateway Controller or a softswitch and performs network wide call control related functions as well as interacts with the appropriate VoIP service related servers when necessary. The CCE functions as a SIP back-to-back user agent and is a signaling endpoint for all call legs between all BEs and the CCE. The CCE may need to interact with various VoIP related Application Servers (AS) in order to complete a call that requires certain service specific features, e.g. translation of an E.164 voice network address into an IP address and so on.

For calls that originate or terminate in a different carrier, they can be handled through the PSTN 120 and 121 or the Partner IP Carrier 160 interconnections. For originating or terminating TDM calls, they can be handled via existing PSTN interconnections to the other carrier. For originating or terminating VoIP calls, they can be handled via the Partner IP carrier interface 160 to the other carrier.

Media Servers (MS) 115 are special servers that typically handle and terminate media streams, and to provide services such as announcements, bridges, transcoding, and Interactive Voice Response (IVR) messages for VoIP service applications. The media servers also interact with customers for media session management to accomplish tasks such as process requests.

Note that a customer in location A using any endpoint device type with its associated access network type can communicate with another customer in location Z using any endpoint device type with its associated network type as well. For instance, a customer at location A using IP customer endpoint device 144 with packet based access network 140 can call another customer at location Z using TDM endpoint device 123 with PSTN access network 121. The BEs 112 and 113 are responsible for the necessary signaling protocol translation, e.g., SS7 to and from SIP, and media format conversion, such as TDM voice format to and from IP based packet voice format.

The above network is described to provide an illustrative environment in which packets are transported and services are provided over communications networks. The Internet has emerged as a critical communications infrastructure, carrying traffic for a wide range of applications. Internet services such as VoIP and SoIP services are becoming ubiquitous and are enabling businesses to expand globally and to add new products and services. From time to time, the operations support systems are updated to incorporate changes to the products and services being provided. For example, a telecommunications service provider may add new features to existing products. The addition of these features may necessitate changes to the sales, ordering, provisioning and billing operations support systems. In another example, if a telecommunications service provider begins providing services in a new country, changes to the sales and ordering operations support systems, billing and price structures, etc. may be required. In another example, products may be added or removed. For many businesses, these kinds of product changes occur on a regular basis.

However, product specific coding is time consuming and expensive. When the changes affect multiple operational support systems, the problem is further compounded by difficulties in synchronizing all the coding changes that may be needed across multiple operational support systems. Thus, some operations support systems may be outdated soon after completion. Therefore, there is a need for a method that drives operations support systems entirely from product metadata and removes the need to implement product specific coding.

In one embodiment, the current invention discloses a method and apparatus for providing a product metadata driven framework for operations support systems, e.g., as used in packet networks such as VoIP and SoIP networks. In order to clearly illustrate the teachings of the current invention, the following terminologies for product structure and networking will first be described:

Metadata;

Metalanguage;

Extensible Markup Language (XML);

Objects, classes and subclasses;

Attribute; and

XML Schema.

Metadata refers to a definition or a description of data. Metalanguage refers to a description of a language. Metadata and metalanguage specify rules and constraints for accomplishing certain functions such as data gathering, etc.

The Standard Generalized Markup Language (SGML) refers to a metalanguage that describes the structure for documents including items such as headings, paragraphs, etc. For example, Hyper Text Markup Language (HTML) is a specific type of SGML used for building web pages. An Extensible Markup Language (XML) refers to a metalanguage for describing and providing rules for a collection of data. It is modeled after SGML.

In object-oriented programming, an object class describes a group of objects with similar properties (i.e., attributes), common behavior, common relationships to other objects, and common semantics. An object instance, derived from an object class, is created and operated on at runtime. A subclass is a refined version of a class (e.g., 'cable modem' and 'router' are refined versions of 'equipment').

An attribute is a property or data value held by the objects in a class or subclass. For example, read-only may be an attribute for a file that can be "read" but not altered. In another example, a database may have defined attributes for the "values" or "types" of data that may be stored in a table. The table is then the object, and the "values" or "types" of data are the attributes.

XML Schema refers to a language for describing the structure and constraining the contents of XML documents, i.e., for describing various elements in an XML document. XML schema can be used to define objects and their attributes and relationships to other objects. If XML Schema is not used, these relationships may be defined using other languages with the capability to represent hierarchical structures of objects, classes and subclasses (e.g., UML or even Microsoft Excel).

The current invention provides a semantic dictionary of attributes, components, product and offers. The attributes, components, products and offers provide a hierarchical schema of a product structure. For example, components aggregate attributes and/or other components. Components may further constrain but may not expand upon the valuesets of the attributes they contain. Products aggregate components and other products. Products may further constrain but may not expand upon the valuesets of the components and attributes they contain. Offers aggregate products and associate the products with various price plans.

Figure 2:
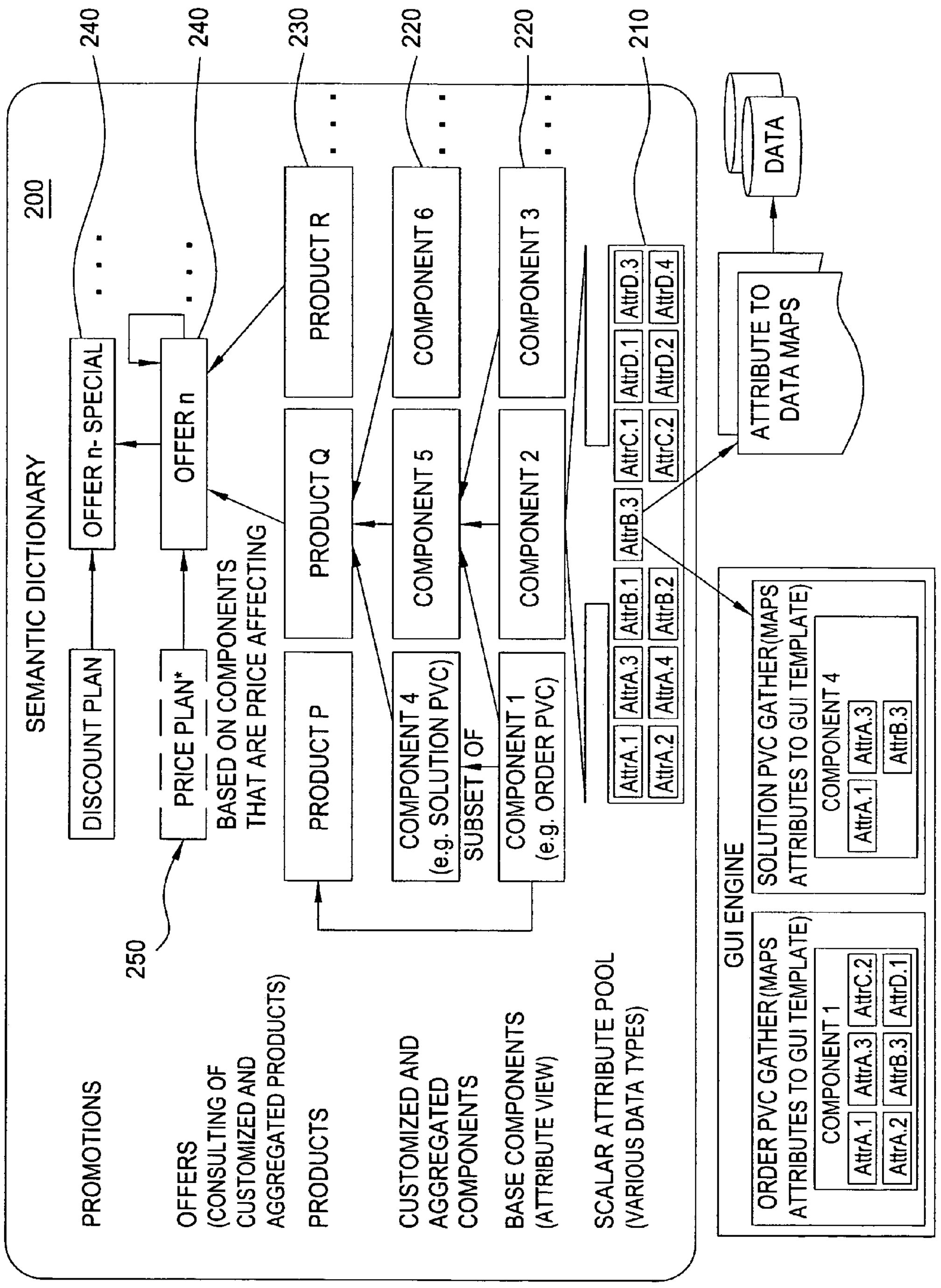
FIG. 2 illustrates an exemplary semantic dictionary.

FIG. 2 illustrates an exemplary semantic dictionary 200 containing attributes 210, components 220, products 230, and offers 240. A metadata about each attribute, component, product and offer is provided in accordance with the present invention. For example, an offer 240 may associate a price plan 250 with each product 230. The metadata may be expressed in XML schema, Microsoft Excel, etc. An example of metadata for an attribute written in XML is provided below:

```
<AttributeMetadata>
  <Id>1892</Id>
  <Name>Speed</Name>
  <DisplayName>Speed</DisplayName>
  <Description>Words words words</Description>
  <HelpLink>URL</HelpLink>
  <Status>Active</Status>
  <Orderable>FALSE</Orderable>
  <Version>1.0</Version>
  <CreationDate>10/11/04</CreationDate>
  <EffectiveDate>10/11/04</EffectiveDate>
  <EndDate>12/31/04</EndDate>
  <Classification>Ref</Classification>
  <RegionalAvailability>RefID</RegionalAvailability>
  <XmlSchema>URL</XmlSchema>
  <Xpath>expression</Xpath>
  <DataType></DataType>
  <UnitOfMeasure>kbps</UnitOfMeasure>
  <GUIWidget>ref</GUIWidget>
</AttributeMetadata>
```

In the above example, the XML tag elements specify metadata about, and define the attribute, which in the above example is ‘Speed’. For example, the XML tag element “<UnitOfMeasure>” specifies the units the ‘Speed’ attribute is expressed in. The <DataType> element, shown but not specified above, is then expressed in a unique syntax. An example of the unique syntax including limits and constraints is provided below:

```
<DataType>
  <String>
    <MaxLength>nnn</MaxLength>
    <Default>Mary had a little lamb</Default>
  <String>
</DataType>
<DataType>
  <Numeric type=int>
    <MinValue>0</MinValue>
    <MaxValue>5</MaxValue>
    <Default>1</Default>
  </Numeric>
</DataType>
<DataType><Boolean default=TRUE/></DataType>
<DataType>
  <Enum MinOccurs=0 MaxChoices=All>
    <Values>
      <Value>Red</Value>
      <Value>Blue</Value>
    </Values>
    <Default>Red</Default>
  </Enum>
</DataType>
<DataType>
  <Pattern>
    <Structure>nnn’-‘nnn’-‘nnnn</Structure>
```

-continued

```
    <!-- use a for alpha, n for number, b for both and ‘x’
    for literals -->
    <Default>333-222-1111</Default>
  </Pattern>
</DataType>
```

In one embodiment, components aggregate attributes and/or other components. Components further constrain but may not expand upon the valuesets of the attributes they contain. They also may not add back attribute values that were removed as part of the definition of the components that are incorporated. Hence, components may only further subset attribute values of any other components that they incorporate. An example of a component metadata defined in XML schema is provided below:

```
<ComponentMetadata>
  <Id>3192</Id>
  <Name>PVC</Name>
  <DisplayName>PVC</DisplayName>
  <Description>Words words words</Description>
  <HelpLink>URL</HelpLink>
  <Status>Active</Status>
  <Orderable>TRUE</Orderable>
  <Version>1.0</Version>
  <CreationDate>10/11/04</CreationDate>
  <EffectiveDate>10/11/04</Effective Date>
  <EndDate>12/31/04</EndDate>
  <Classification>Ref</Classification>
  <RegionalAvailability>RefID</RegionalAvailability>
  <XmlSchema>URL</XmlSchema>
  <Xpath>expression</Xpath>
  <TopLevelStructure>
    <CollectionGroup>
    <OnEntry>. . .</OnEntry>
    <OnExit>. . .</OnExit>
    <Attribute Id=A minOccurs=0>
      <OnEntry>. . .</OnEntry>
      <OnExit>. . .</OnExit>
    </Attribute>
    <Component Id=3 minOccurs=1>
      <OnEntry. . .</OnEntry>
      <OnExit>. . .</OnExit>
    </Component>
  </CollectionGroup>
  <CollectionGroup>
      <Sequence minOccurs=0 maxOccurs=5>
        <Attribute Id=C minOccurs=1></Attribute>
        <Component Id=4
        minOccurs=0></Component>
      </Sequence>
    </CollectionGroup>
  </TopLevelStructure>
</ComponentMetadata>
```

In one embodiment, products aggregate components and other products. Products may not add values to attribute definitions. An example of a product metadata is provided below:

```
<ProductMetadata>
  <Id>92</Id>
  <Name>Wireless</Name>
  <DisplayName>Wireless</DisplayName>
  <Description>Words words words</Description>
  <HelpLink>URL>/HelpLink>
  <Status>Active</Status>
  <Orderable>TRUE</Orderable>
  <Version>1.0</Version>
  <CreationDate>10/11/04</CreationDate>
  <EffectiveDate>10/11/04</EffectiveDate>
```

-continued

```
    <EndDate>12/31/04</EndDate>
    <RegionalAvailability>RefID</RegionalAvailability>
    <XmlSchema>URL</XmlSchema>
    <Xpath>expression</Xpath>
    <OrderGatherRules activity="New">
      <CollectionGroup>
        <OnEntry>. . .</OnEntry>
        <OnExit>. . .</OnExit>
        <Component id=1>
          <OnEntry>. . .</OnEntry>
          <OnExit>. . .</OnExit>
        </Component>
        <Attribute id=a>
          <OnEntry>. . .</OnEntry>
          <OnExit>. . .</On Exit>
        </Attribute>
      </CollectionGroup>
      <CollectionGroup>
        <Component id=3>. . .</Component>
      </CollectionGroup>
    </OrderGatherRules>
    <OrderGatherRules activity="Change">. . .</OrderGatherRules>
    <OrderGatherRules activity="Delete">. . .</OrderGatherRules>
    <OrderGatherRules activity="Suspend">. . .</OrderGatherRules>
    <OrderGatherRules activity="Resume">. . .</OrderGatherRules>
    <SalesGatherRules activity="New">. . .</OrderGatherRules>
    <SalesGatherRules activity="Change">. . .</OrderGatherRules>
    <SalesGatherRules activity="Delete">. . .</OrderGatherRules>
    <SalesGatherRules activity="Suspend">. . .</OrderGatherRules>
    <SalesGatherRules activity="Resume">. . .</OrderGatherRules>
  </ProductMetadata>
```

In one embodiment, offers aggregate products and associate the products with various price plans. An example of a metadata for an offer is provided below:

```
  <OfferMetadata>
    <Id>19</Id>
    <Name>ABN<Name>
    <DisplayName>ABN</DisplayName>
    <Description>Words words words</Description>
    <HelpLink>URL</HelpLink>
    <Status>Active</Status>
    <Orderable>TRUE</Orderable>
    <Version>1.0</Version>
    <CreationDate>10/11/04</Creation Date>
    <EffectiveDate>10/11/04</EffectiveDate>
    <End Date>12/31/04</EndDate>
    <RegionalAvailability>RefID<RegionalAvailability>
    <XmlSchema>URL</XmlSchema>
    <Xpath>expression</Xpath>
    <OrderGatherRules activity="New">
      <CollectionGroup>
        <OnEntry>. . .</OnEntry>
        <OnExit>. . .</OnExit>
        <Product id=1>
          <OnEntry>. . .</OnEntry>
          <OnExit>. . .</OnExit>
        </Product>
      </CollectionGroup>
      <CollectionGroup>
        <Product id=3>. . .</Product>
      </CollectionGroup>
    </OrderGatherRules>
    <OrderGatherRules activity="Change">. . .</OrderGatherRules>
    <OrderGatherRules activity="Delete">. . .</OrderGatherRules>
    <OrderGatherRules activity="Suspend">. . .</OrderGatherRules>
    <OrderGatherRules activity="Resume">. . .</OrderGatherRules>
    <SalesGatherRules activity="New">. . .</OrderGatherRules>
    <SalesGatherRules activity="Change">. . .</OrderGatherRules>
    <SalesGatherRules activity="Delete">. . .</OrderGatherRules>
    <SalesGatherRules activity="Suspend">. . .</OrderGatherRules>
    <SalesGatherRules activity="Resume">. . .</OrderGatherRules>
    <PricingRules>
      <Product id=1>
        <Component id=43>
```

-continued

```
          <FixedPrice></FixedPrice>
          <Algorithm>. . .</Algorithm>
        <PricingOperation>. . .</PricingOpeation>
        </Component>
      </Product>
    </PricingRules>
  </OfferMetadata>
```

In one embodiment, for each product in the semantic dictionary, the XML metadata and metalanguage specifies the rules and/or constraints surrounding Operations Support System (OSS) behaviors like data gathering, e.g., order and sales data gathering. This specification includes a description of the sequence by which subsets of product components and attributes are collected, and the method (e.g., business rule(s)) by which valid attribute value sets that are valid for the different combinations of selected attributes and components are defined. Beyond tags such as <OrderGatherRules> and <SalesGatherRules>, additional tags may be provided to support other functional behaviors. For example, OnEntry and OnExit are tags that allow a metalanguage to provide control over data collection, orchestration, field rendering and cross-field validation. For example, a GUI engine may interpret the XML contained within OnEntry, OnExit and other metadata tags to automatically generate screens without any additional coding.

In one embodiment, the rules need to support at least the following controls, operators, operands and actions:

Controls:
IF
THEN
ELSE
ELSIF
Operators:
DEFINED
NOTDEFINED
EQ
NE
LT
LE
GT
GE
AND
OR
IN
NOTIN
*
+
−
/
(
)
Operands:
STATIC VALUE
GUI
DB
Lookup Result
User Role
Actions:
Orchestration Actions:
Skip
Goto
ValueSet Actions:
Set
ValueSet
Exclude Display Actions:

Hide

Gray

Error

Message

Display

Callout Actions:

Invoke

Examples of the usage of the Controls and Actions are provided below:

```
<OrderGatherRules activity="New">
  <CollectionGroup>
    <Component id=1>
      <OnEntry>
        <IF>
          GUI:semanticName EQ TRUE
        </IF>
        <THEN>
          <Action
          type=goto><Component>3</Component>
          </Action>
          <!-- This skips the display and
          collection of Component 1 entirely -->
          <!-- And causes the data gathering to
          continue with Component 3 -->
        </THEN>
      </OnEntry>
      <OnExit>
        <IF>
          DEFINED (GUI:speed) AND
          (GUI:speed GT
          NAI:RemainingBandwidth)
        </IF>
        <THEN>
          <Action type=error
          code=105></Action>
          <Action
          type=goto><Component>1</Component>
          </Action>
        </THEN>
        <ELSE>
          <Action type=message>Onward and
          upward</Action>
        </ELSE>
      </OnExit>
    </Component>
  </CollectionGroup>
  <CollectionGroup>
    <Component 2 id=2>. . .</Component>
    <Component id=3>. . .</Component>
    <Attribute id=a1>. . .</Attribute>
  </CollectionGroup>
</OrderGatherRules>
```

Note that GUI users may desire to control the sequence by which they define/provide subsets of product/offer metadata. For example, a GUI form may be used to collect customer preferences and an OnExit condition may be defined to go to different collection groups based on GUI: formfield information collected. The metalanguage allows for this kind of control and specification.

Examples of usage of some actions are shown below:

```
<Action type=skip></Action>
<Action type=goto><Component>3</Component></Action>
<Action type=set attribute=A>value</Action>
<Action type=valueset attribute=A>
<Value>value1</value>
<Value>value2</value>
<Value><Action type=invoke>URL</Action></value>
</Action>
<Action type=exclude attribute=A>
<Value>value1</value>
<Value>value2</value>
</Action>
<Action type=hide>
<Attribute>A</Attribute>
<Component>5</value>
</Action>
<Action type=gray>
<Attribute>A</Attribute>
<Component>5</value>
</Action>
<Action type=error>Error 105</Action>
<Action type=message>Message 5</Action>
<Action type=display>
<image caption=words>/images/picture.gif</image>
<paragraph justify=center>words words words</paragraph>
</Action>
```

In one embodiment, the current invention provides the semantic dictionary, metadata and metalanguage, where they can then be modified as needed, e.g., when a new product or a new service is introduced. For example, the current invention provides framework aware engines (broadly defined as compilers) for reading and compiling the product metadata and metalanguage into runtime forms. For example, scripted HTML templates may be the runtime form used by an Order Data Gathering engine which presents GUIs to end users. Some examples of functional domains are sales support, provisioning, billing, ordering, validation, user interface presentation, and the like. The various operations support systems leverage the framework aware engines and eliminate the need for product specific programming in each operations support system.

For example, when a product is added, the product specific OSS behavior is identified and specified using metadata and metalanguage. The runtime implementation of each behavior is either generated automatically by a framework aware OSS engine by compiling the metadata or metalanguage, and/or it is hand-coded by developers with reference to the specified metadata and metalanguage constructs. The runtime artifacts are then tested before being put in service.

For example, a service provider may wish to provide an additional data rate option for an existing service. The new data rate may affect multiple operations support systems. The metadata describing the data rate attribute would be extended to reflect the expanded capability. This would then be instantly adopted by all components which included that data rate attribute, subject to any additional constraints they may have imposed on the data rate attribute valueset. The new metadata definitions would be compiled in the context of a software release cycle and the runtime artifacts generated would be thoroughly tested. GUIs, validation engines, sales tools, billing and provisioning systems would automatically reflect the new data rate despite the fact that no actual coding changes in these systems would have to be made.

Figure 3:
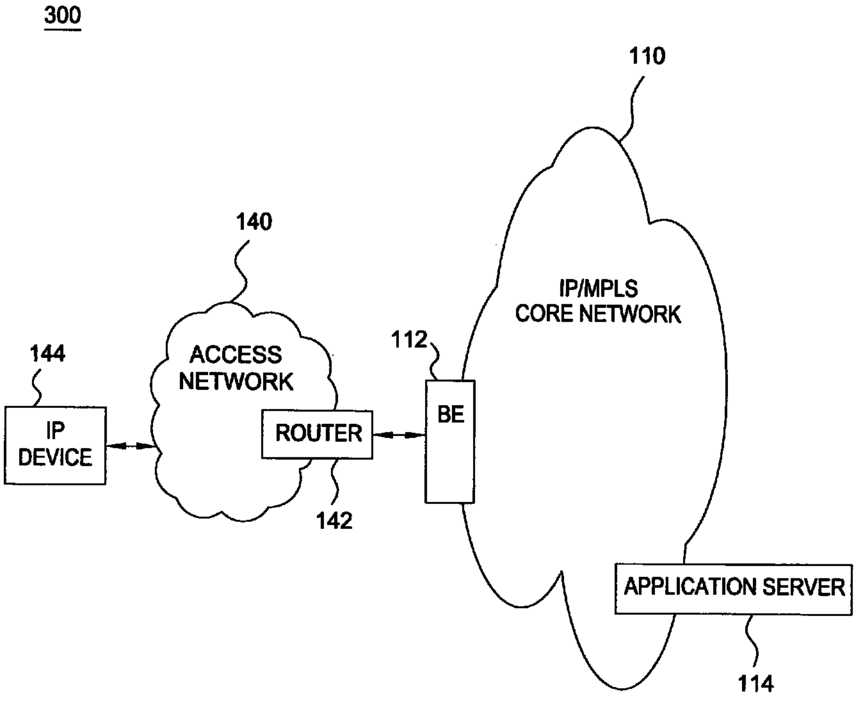
FIG. 3 illustrates an exemplary network with one embodiment of the invention for providing product metadata driven framework for operations support systems.

FIG. 3 illustrates an exemplary network 300 of the present invention for providing a metadata driven framework for operations support systems. For example, a customer is using an IP device 144 to access the IP services such as VoIP and SoIP services. IP device 144 is connected to an access network 140, where the access network 140 contains a gateway router 142. The gateway router 142 is connected to an IP/MPLS core network 110 through a border element 112.

In one embodiment, the service provider may utilize an application server 114 to provide VoIP or SoIP services that may be altered without requiring reprogramming (coding) in each Operations Support System (OSS). The OSS behaviors to be specified and delivered using metadata and metalanguage constructs are identified. Although only one application server is shown, it should be noted that the service provider may utilize multiple applications servers in the network to implement the various steps for delivering a hierarchical structure, for creating the associated metadata and metalanguage, for providing compilers for each operations functional domain, for compiling the various programs and for performing tests. The above description is not intended to limit the implementation of the present invention. Note that only the network elements used to describe the present invention are illustrated in FIG. 3. It is not intended to show all network elements used to deliver a VoIP or SoIP service.

Figure 4:
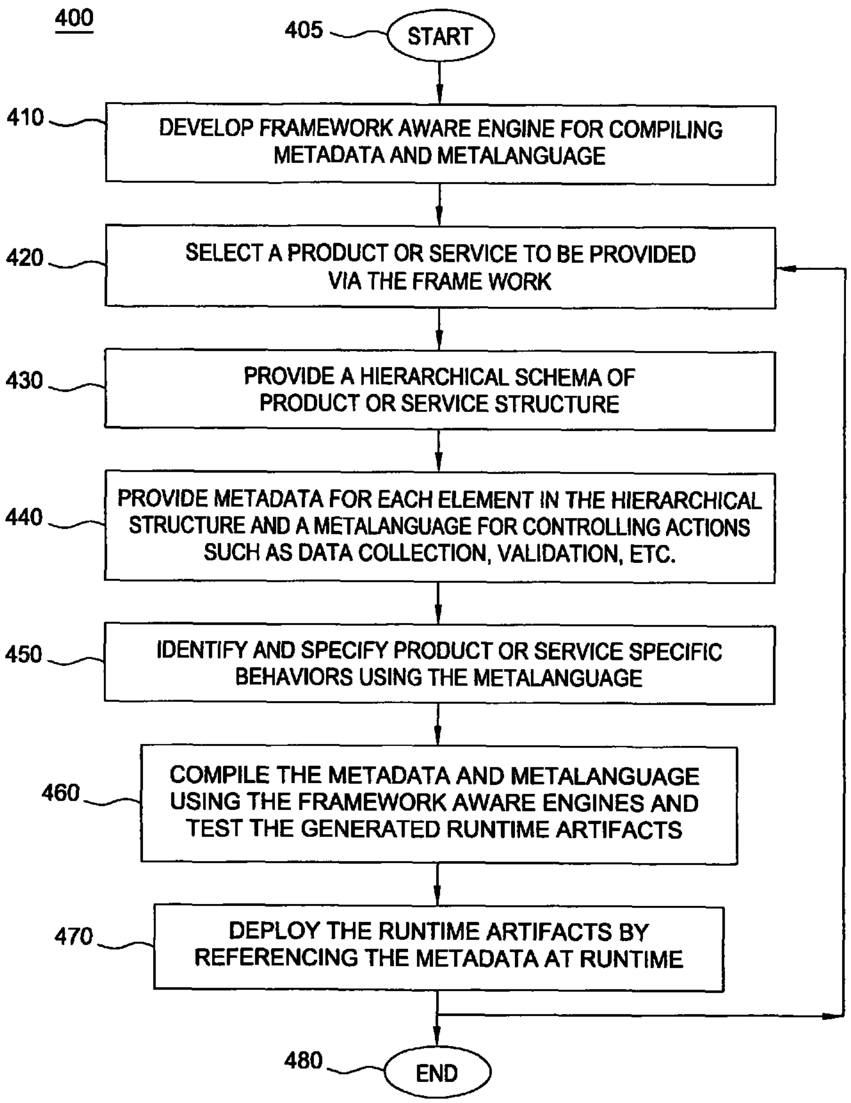
FIG. 4 illustrates a flowchart of the method for providing product metadata driven framework for operations support systems.

FIG. 4 illustrates a flowchart of a method 400 for providing a metadata driven framework for operations support systems that can be used in a network. Method 400 starts in step 405 and proceeds to step 410.

In step 410, method 400 develops one or more framework aware engines. The framework aware engines are used for compiling the metadata and metalanguage into runtime forms or instantiation for each operations support system.

In step 420, method 400 selects a service or product to be provided via the framework. For example, if a telecommunications service provider is adding a new data rate for an existing service, then the service rate is identified.

In step 430, method 400 provides a hierarchical schema of product or service structure. For example, the method provides a semantic dictionary comprising of a plurality of elements: attributes, components, products and offers, as illustrated in FIG. 2, with attributes being at the lowest level. Note that the content of the semantic dictionary is different based on the type of business. For example, in the field of telecommunications (e.g., for a telecommunication product), an attribute can be a data rate, whereas a component can be a geographic region where the data rate is available, whereas a product can be a type of communication service, e.g., a wireless service that is available in the geographic region at the data rate, and whereas an offer is an offer of the wireless service associated with a particular price, and the like. Alternatively, in a video on-demand business, an attribute can be an image quality measure, e.g., a high definition quality versus a standard quality, whereas a component is a movie that is available in one of the image quality measure, whereas a product is a video on demand service for any movie at one of the image quality measure that can be accessed at any time, whereas an offer is the video on demand service associated with a particular price plan, e.g., 10 movies per month at a predefined price, and the like. Once a semantic dictionary is created in accordance for a particular business, then any additions or modifications to products and services can be easily deployed with minimal impact to operations support systems.

In step 440, method 400 provides a metadata for each element in the hierarchical structure and a metalanguage for controlling data collection, orchestration, field rendering and cross-field validation. For the above example, metadata is provided for attributes, components, products and offers. For example, a metadata for a product may specify the rules and/or constraints (e.g., business rule(s)) for data gathering, the sequence by which subsets of attributes and components are collected, the valid values for the attributes and components, etc.

In step 450, method 400 identifies and specifies the product or service specific behaviors (e.g., order data gathering, validation, etc.) using the metalanguage. For example, the price plan for a product may be altered. The customer premise equipment may have to be reconfigured, the billing options may be simplified, etc.

In step 460, method 400 compiles the metadata and metalanguage using the framework aware engines and tests the generated runtime artifacts. For example, a specific Java scripted HTML template or rules engine business rules may be generated and tested. Each instantiation of the business rule is tested. For example, the rule may be invoked several times. The framework aware engine compiles the metadata and metalanguage including multiple instantiations.

In step 470, method 400 deploys the runtime artifacts by referencing the metadata at runtime. For example, the generated HTML templates may reference databases, other GUI fields or valuesets as specified by the metalanguage to support one or more updates for one or more operations support functions, e.g., generating an updated GUI interface, e.g., on a website, for customers to subscribe to a new service, generating a new billing format for billing the new service, generating a new provisioning function for provisioning the new service requested by customers, and the like.

The method then proceeds to step 480 to end processing the current change in service and product. Alternatively, the method may proceed back to step 420 to perform another change to a product or a service.

In one embodiment, the present method updates the semantic dictionary as needed. For example, if the semantic dictionary did not contain all the attributes needed for an additional service, then the attributes and the metadata can be added. Those skilled in the art would also realize the steps in the above implementation may not be sequential or in the particular sequence used in FIG. 4. The above illustrative flowchart is not intended to limit the implementation.

Figure 5:
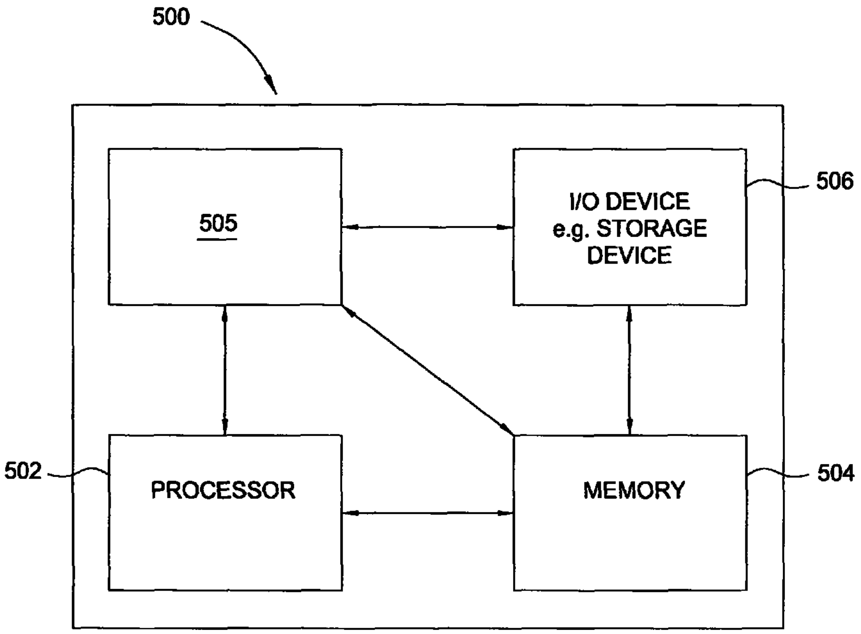
FIG. 5 illustrates a high-level block diagram of a general-purpose computer suitable for use in performing the functions described herein.

FIG. 5 depicts a high-level block diagram of a general-purpose computer suitable for use in performing the functions described herein. As depicted in FIG. 5, the system 500 comprises a processor element 502 (e.g., a CPU), a memory 504, e.g., random access memory (RAM) and/or read only memory (ROM), a module 505 for providing a metadata driven framework for operations support systems, and various input/output devices 506 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, alarm interfaces, power relays and the like)).

It should be noted that the present invention can be implemented in software and/or in a combination of software and hardware, e.g., using application specific integrated circuits (ASIC), a general-purpose computer or any other hardware equivalents. In one embodiment, the present module or process 505 for providing a metadata driven framework for operations support systems can be loaded into memory 504 and executed by processor 502 to implement the functions as discussed above. As such, the present method 505 for providing a metadata driven framework for operations support systems (including associated data structures) of the present invention can be stored on a computer readable medium or carrier, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing an update, comprising:

providing, by a processor, a semantic dictionary having a hierarchical schema for a product, wherein the hierarchical schema comprises a plurality of elements organized in a hierarchical structure, wherein the plurality of elements comprises an attribute, a component, and a product, wherein the product contains the component, wherein the component contains the attribute, wherein the product is a telecommunication product provided by a network service provider on a communication network, wherein the telecommunication product comprises a wireless service, wherein the attribute comprises a data rate associated with the wireless service, wherein the component comprises a geographical region associated with the wireless service, wherein the providing the semantic dictionary comprises:

providing a metadata for each of the plurality of elements;

providing a metalanguage, wherein the metalanguage is used for controlling a function comprising data manipulation; and providing a compiler for compiling the metadata and the metalanguage;

selecting, by the processor, the product to be provided;

identifying, by the processor, a product behavior associated with the product, wherein the product behavior comprises an order data gathering associated with the wireless service;

linking, by the processor, the product behavior with an element of the plurality of elements in the semantic dictionary; and using, by the processor, the semantic dictionary to generate the update for an operations support function in response to the product behavior being linked with the element of the plurality of elements in the semantic dictionary, wherein the update comprises a scripted hyper text markup language template, wherein the scripted hyper text markup language template is a runtime form, wherein the operations support function comprises a provisioning function for supporting the telecommunication product, wherein the update for the operations support function is generated in accordance with a rule that is specified in the metalanguage and the metadata, wherein the scripted hyper text markup language template is generated by the rule specified in the metalanguage and the metadata, along with a runtime instantiation of a business rule supporting a validation of data collected via the scripted hyper text markup language template.

2. The method of claim 1, wherein the plurality of elements further comprises: an offer, where the attribute is at a lowest level of the hierarchical structure.

3. The method of claim 1, wherein the communication network is an internet protocol network.

4. A tangible computer-readable medium storing a plurality of instructions which, when executed by a processor, cause the processor to perform operations for providing an update, the operations comprising:

providing a semantic dictionary having a hierarchical schema for a product, wherein the hierarchical schema comprises a plurality of elements organized in a hierarchical structure, wherein the plurality of elements comprises an attribute, a component and a product, wherein the product contains the component, wherein the component contains the attribute, wherein the product is a telecommunication product provided by a network service provider on a communication network, wherein the telecommunication product comprises a wireless service, wherein the attribute comprises a data rate associated with the wireless service, wherein the component comprises a geographical region associated with the wireless service, wherein the providing the semantic dictionary comprises:

providing a metadata for each of the plurality of elements;

providing a metalanguage, wherein the metalanguage is used for controlling a function comprising data manipulation; and providing a compiler for compiling the metadata and the metalanguage;

selecting the product to be provided;

identifying a product behavior associated with the product, wherein the product behavior comprises an order data gathering associated with the wireless service;

linking the product behavior with an element of the plurality of elements in the semantic dictionary; and using the semantic dictionary to generate the update for an operations support function in response to the product behavior being linked with the element of the plurality of elements in the semantic dictionary, wherein the update comprises a scripted hyper text markup language template, wherein the scripted hyper text markup language template is a runtime form, wherein the operations support function comprises a provisioning function for supporting the telecommunication product, wherein the update for the operations support function is generated in accordance with a rule that is specified in the metalanguage and the metadata, wherein the scripted hyper text markup language template is generated by the rule specified in the metalanguage and the metadata, along with a runtime instantiation of a business rule supporting a validation of data collected via the scripted hyper text markup language template.

5. The tangible computer-readable medium of claim 4, wherein the plurality of elements further comprises: an offer, where the attribute is at a lowest level of the hierarchical structure.

6. The tangible computer-readable medium of claim 4, wherein the communication network is an Internet protocol network.

7. An apparatus for providing an update, comprising:

a processor; and a computer-readable medium storing a plurality of instructions which, when executed by the processor, cause the processor to perform operations, the operations comprising:

providing a semantic dictionary having a hierarchical schema for a product, wherein the hierarchical schema comprises a plurality of elements organized in a hierarchical structure, wherein the plurality of elements comprises an attribute, a component and a product, wherein the product contains the component, wherein the component contains the attribute, wherein the product is a telecommunication product provided by a network service provider on a communication network, wherein the telecommunication product comprises a wireless service, wherein the attribute comprises a data rate associated with the wireless service, wherein the component comprises a geographical region associated with the wireless service, wherein the providing the semantic dictionary comprises:

providing a metadata for each of the plurality of elements;

providing a metalanguage, wherein the metalanguage is used for controlling a function comprising data manipulation; and providing a compiler for compiling the metadata and the metalanguage;

selecting the product to be provided;

identifying a product behavior associated with the product, wherein the product behavior comprises an order data gathering associated with the wireless service;

linking the product behavior with an element of the plurality of elements in the semantic dictionary; and using the semantic dictionary to generate the update for an operations support function in response to the product behavior being linked with the element of the plurality of elements in the semantic dictionary, wherein the update comprises a scripted hyper text markup language template, wherein the scripted hyper text markup language template is a runtime form, wherein the operations support function comprises a provisioning function for supporting the telecommunication product, wherein the update for the operations support function is generated in accordance with a rule that is specified in the metalanguage and the metadata, wherein the scripted hyper text markup language template is generated by the rule specified in the metalanguage and the metadata, along with a runtime instantiation of a business rule supporting a validation of data collected via the scripted hyper text markup language template.

* * * * *